United States Patent [19]

Iwata et al.

[11] Patent Number: 4,543,456

[45] Date of Patent: Sep. 24, 1985

[54] SWITCH DEVICE FOR VEHICLE-SPEED CONTROL

[75] Inventors: Masayosi Iwata, Gifu; Harumi Douke; Hiroyuki Sawada, both of Aichi, all of Japan

[73] Assignee: Kabushiki Kaisha Tokai-Rika-Denki-Seisakusho, Aichi, Japan

[21] Appl. No.: 487,146

[22] Filed: Apr. 21, 1983

[30] Foreign Application Priority Data

Apr. 23, 1982 [JP] Japan ................. 57-59898[U]

[51] Int. Cl.⁴ .............................................. H01H 9/00
[52] U.S. Cl. .................................... 200/61.54; 200/157
[58] Field of Search .................. 200/61.39, 61.54, 153, 200/157, 335, DIG. 39

[56] References Cited

U.S. PATENT DOCUMENTS

| | | | |
|---|---|---|---|
| 3,481,422 | 12/1969 | Mueller et al. | 200/61.54 X |
| 3,761,662 | 9/1973 | Charles | 200/61.54 X |
| 4,219,706 | 8/1980 | Koch et al. | 200/61.54 X |
| 4,241,298 | 12/1980 | Trammell, Jr. et al. | 200/157 X |
| 4,321,437 | 3/1982 | Cryer | 200/61.54 |
| 4,379,954 | 4/1983 | Iwata et al. | 200/61.54 X |
| 4,393,280 | 7/1983 | Iwata et al. | 200/61.54 X |
| 4,408,104 | 10/1983 | Iwata et al. | 200/61.54 |

FOREIGN PATENT DOCUMENTS 3006066 3/1979 Fed. Rep. of Germany ... 200/61.54

*Primary Examiner*—G. P. Tolin
*Attorney, Agent, or Firm*—Koda and Androlia

[57] ABSTRACT

An operation lever is mounted on a base for mounting a turn-signal switch provided to a steering column and is elongated in the radius direction of the steering column, the operation lever being capable of being operated from a neutral position selectively to a resume position or a coast position. A vehicle-speed controlling circuit is actuated to set a vehicle-speed according to the operation of the operation lever.

7 Claims, 7 Drawing Figures

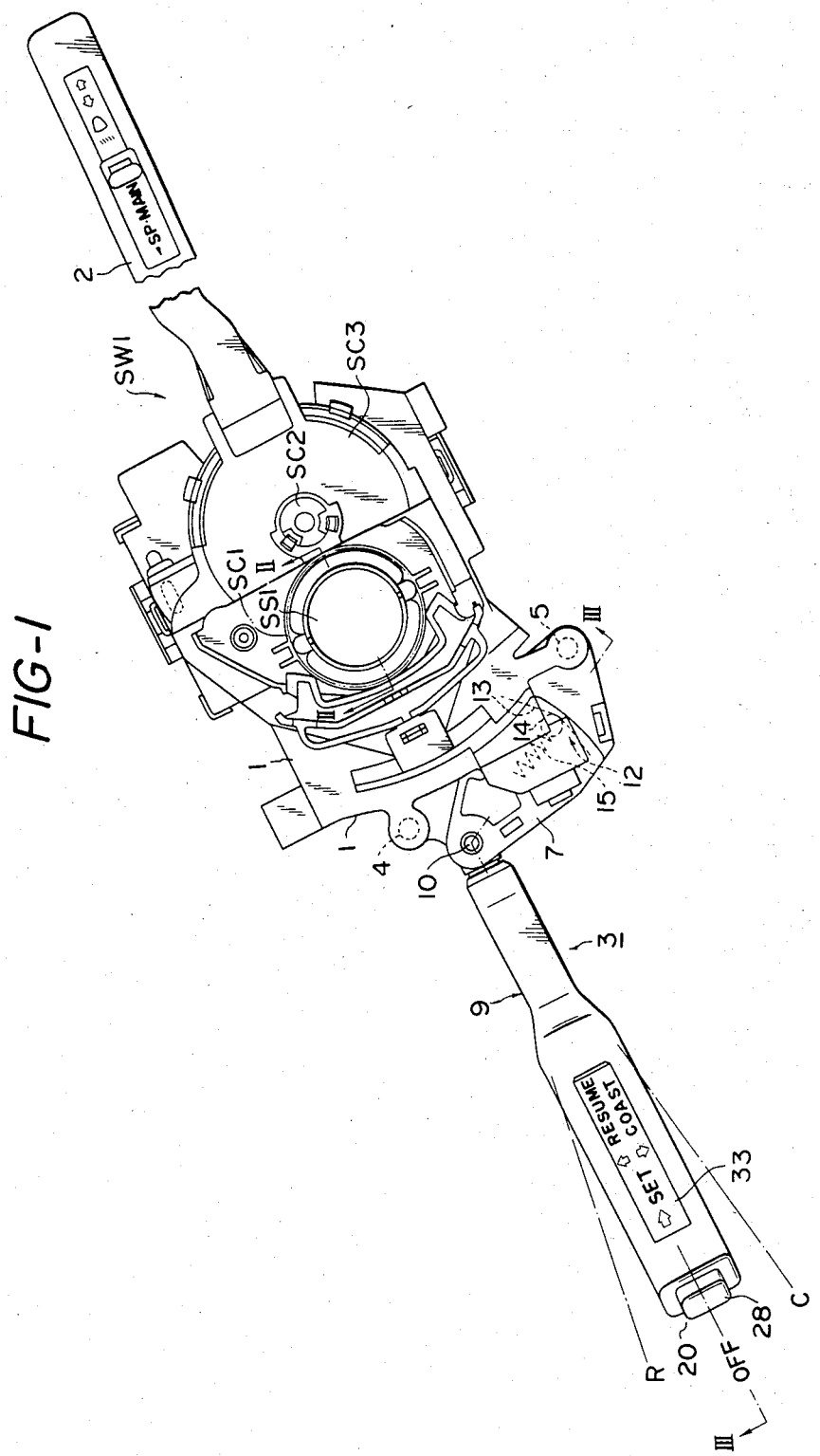

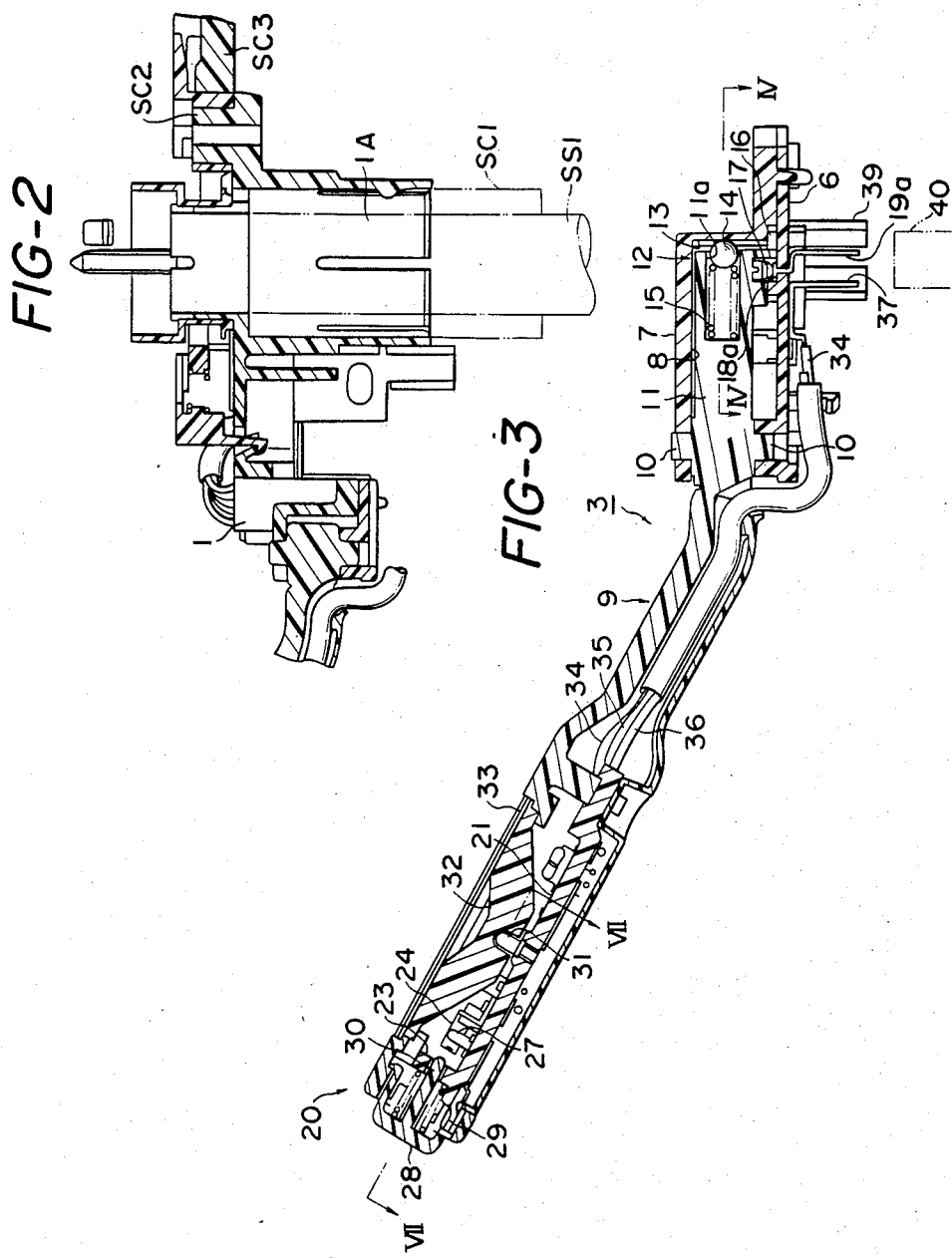

SWITCH DEVICE FOR VEHICLE-SPEED CONTROL

BACKGROUND OF THE INVENTION

1. Field of the Invention

The present invention relates to a vehicle-speed controlling device, forming so-called resume circuit and coast circuit.

2. Description of the Prior Art

A switch device for vehicle-speed control in an automobile functions in such a manner that, even if a driver releases his foot from an accelerator pedal, the vehicle-speed of the automobile is able to be kept in a fixed value set by him.

The switch device for vehicle-speed control is constructed such that according to an operation of a control switch by the driver such a driving force as an engine negative pressure or the like is added to an actuator and an engine throttle valve is maintained in a predetermined opening angle. The control switch is provided with a set switch for setting a vehicle-speed, a resume switch for restoring the set vehicle-speed when the vehicle-speed is lowered below the set vehicle-speed and the like.

In the prior art, for example U.S. Pat. No. 3,481,422, the switch for the switch device for vehicle-speed control is mounted on a lever of a turn-signal switch provided on a steering column for signalling the change of an advance course of the automobile. That is, a turn-signal lever operating the turn-signal switch is elongated from the steering column to a right angle thereto and the switch for the vehicle-speed controlling device is mounted on the turn-signal lever.

In such a structure, however, a plurality of wires and a switch mechanism for the vehicle-speed controlling switch is assembled in the turn-signal lever, for which the design and manufacture of the turn-signal lever are made complicated. In addition thereto, it is not preferable, in view of the reliability of operations, that the vehicle-speed controlling switch to which sufficiently careful operations are required for safety drive is mounted on the turn-signal lever. These points have to be sufficiently taken into consideration in recent automobiles tending to mount a wipper switch and the other switches on the turn-signal switch. Furthermore, the vehicle-speed controlling device is an option part mounted on the automobile according to requirement of customers and, therefore, it causes the complication of the design, manufacture and assembly that the turn-signal levers being mounted with the vehicle-speed controlling switch and being not are produced separately of each other.

SUMMARY OF THE INVENTION

The present invention has been developed in view of the above-described facts and has as its object the provision of a switch device for vehicle-speed control, making it possible to be simply and reliably operated without causing any operation mistakes by a driver.

In the switch device for vehicle-speed control according to the present invention, an operation lever for actuating a resume circuit and a coast circuit which are vehicle-speed control circuits in a switch device for vehicle-speed control of an automobile is elongated from a steering column separately of a turn-signal lever whereby the design and manufacture of the operation lever and the turn-signal lever are made easy and the operations of the levers by the driver are also made simple and secure.

Description will hereinunder be given of an embodiment of the present invention with reference to the drawings.

BRIEF DESCRIPTION OF THE DRAWINGS

The drawings show one embodiment according to the present invention:

FIG. 1 is a plan view showing a condition that a turn-signal switch unit and a vehicle-speed controlling switch unit are mounted on a base;

FIG. 2 is a sectional view taken along the line II—II in FIG. 1;

FIG. 3 is a vertical sectional view taken along the line III—III in FIG. 1;

DESCRIPTION OF THE PREFERRED EMBODIMENT

Figure 4:
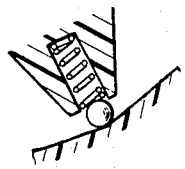
FIG. 4 is a sectional view taken along the line IV—IV in FIG. 3.

A steering column, not shown, in an automobile is provided with a turn-signal switch base 1 where a turn-signal lever 2 is rotatably supported and therewith a turn-signal switch mechanism SW1 operated by the turn-signal lever 2 is provided.

In the turn-signal switch mechanism SW1, as shown in FIG. 2, a steering column tube SC1 is inserted into a cylindrical portion 1A of the turn-signal switch base 1 and the cylindrical portion 1A is securely clamped to the steering column tube SC1. A bracket SC3 is pivotally supported to a hollow support shaft SC2 projected in parallel with a steering shaft SS1. A turn-signal lever 2 is elongated from the bracket SC3 in a radius direction of the steering shaft SS1 and a turn-signal switch, not shown, is turned on by rotating the turn-signal lever 2 about the support shaft SC2 from a neutral position to either of the operating positions so that turn-signal lamps are actuated to signal a change of an advance course of an automobile.

Now, mounted and supported on the turn-signal switch base 1 through screws 4, 5 is a switch unit 3 applied for switch device for vehicle-speed control.

An insulator 6 is formed with fitting holes 6a, 6b (refer to FIG. 5) where the screws 4, 5 are inserted, a switch body 7 is fixed to the insulator 6 in a form covering it and a receiving space 8 having an opening left on FIG. 3 is formed between the insulator 6 and the switch body 7. An operation lever 9 is provided at the side of the base 1 integrally with projections 10, 10 and a holder member 11 positioned in the receiving space 8 and is supported between the insulator 6 and the switch body 7 through the projections 10, 10 so as to be made rotatable in up and down directions between a resume position R and a coast position C. An automatic restoring mechanism 12 always forces the operation lever to a neutral position OFF situated between the resume position R and the coast position C (refer to FIG. 1) and comprises a V-shaped guide portion 13 formed on a bottom of the receiving space 8 especially in the switch body 7, a detent ball 14 supported in a blind hole 11a formed on a forward end of the holder member 11 and a spring 15 positioned in the blind hole 11a and forcing the ball 14 to the V-shaped guide portion 13. The automatic restoring mechanism 12 is constructed in such a manner that the operation lever 9 is positioned in the neutral position OFF when the ball 14 is positioned in the center of the V-shaped guide portion 13.

Accordingly, when the operation lever 9 is operated and rotated to the respective resume position R or coast position C, the ball 14 is rolled on the V-shaped guide portion 13 while compressing and deforming the spring 15, and thereafter when the rotating operation of the operation lever 9 is released, the ball 14 is restored to the beginning position due to the restoring force of the spring 15, that is the operation lever 9 is returned back to the neutral position OFF.

Figure 6:
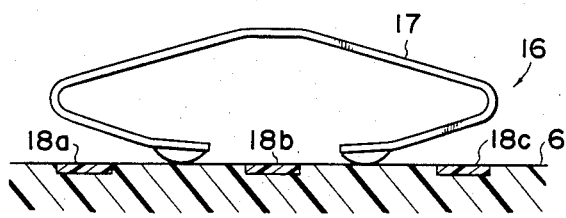
FIG. 6 is an enlarged vertical sectional view of a switching mechanism.

A switch mechanism 16 comprises a movable contact 17 supported on the holder member 11 and three fixed contacts 18a, 18b, 18c arranged on the insulator 6 (refer to FIG. 6).

In the switch mechanism 16 the movable contact 17 bridges the fixed contacts 18a and 18b when the operation lever 9 is rotated to the resume position R, it bridges the fixed contacts 18b and 18c when the operation lever 9 is rotated to the coast position C and the fixed contacts 18a, 18b and 18c are put in an open condition when the operation lever 9 is positioned in the neutral position OFF.

In addition, when the operation lever 9 is rotated to the resume position R a resume circuit in a vehicle-speed controlling device is formed through the fixed contacts 18a and 18b bridged corresponding to the rotation, and when the operation lever 9 is rotated to the coast position C a coast circuit in the vehicle-speed controlling device is formed through the fixed contacts 18b and 18c bridged corresponding to the rotation.

Figure 5:
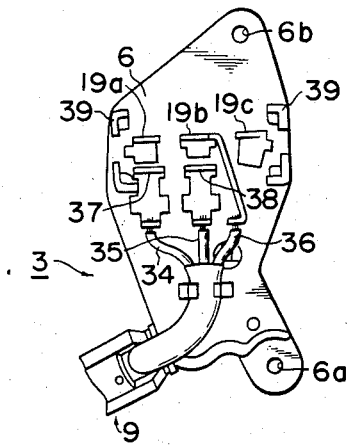
FIG. 5 is a back plan view of an insulator.

As shown in FIG. 5, the respective fixed contacts 18a, 18b and 18c are integrally provided with terminals 19a, 19b and 19c which are projected through the insulator 6.

A set switch 20 of the switch device for vehicle-speed control is constructed as follows.

Received and fixed into the operation lever 9 is a switch base 21, near the left end of which a vertical wall 23 provided with a through-hole 22 is formed. A movable contact 24 consists of curved portion 24a formed in a semi-circle and left and right side portions 24b, 24c extended and formed from both the ends of the curved portion 24a to be formed in a U shape. Also, formed on the right side portion 24c is a fixing portion 24d which is fixed to the switch base 21 and opposed to the vertical wall 23 is the left side portion 24b. Furthermore, the left side portion 24b as being a free end of the movable contact 24 is expanded to form a contact projection 25. The movable contact 24 is made of such an elastic material as a phosphor bronze plate.

Formed on the switch base 21 are a pair of detent projections 26, 26 which are positioned in such a manner that the portion of the right side portion 24c close to the curved portion 24a is put between the detent projections 26 and 26 through a slight gap formed therebetween.

Fixed to the switch base 21 is a fixed contact 27 which are positioned between the left and right side portions 24b, 24c, being opposed to the contact projection 25.

Movably mounted on the end portion of the operation lever 9 in a direction of the axis thereof is a push button 28 formed with a stopper preventing it from falling out in the axis direction of the operation lever 9 and always forced to the projecting direction thereof by a compression spring 29 positioned between the inside of the push button 28 and the vertical wall 23.

Formed on the inside of the push button 28 in the direction of the movable contact 24 is a pressing projection 30 which is opposed to the left side portion 24b of the movable contact 24 with a predetermined gap therebetween through the through-hole 22 of the vertical wall 23.

Figure 7:
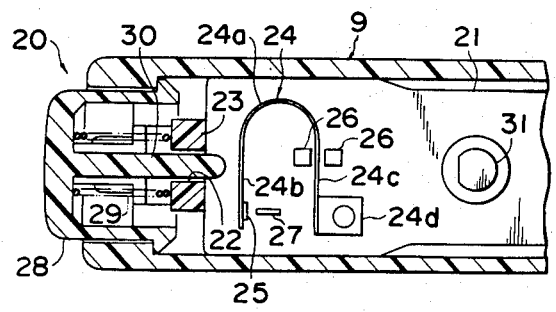
FIG. 7 is an enlarged cross sectional view taken along the line VII—VII, showing a main portion different from FIG. 3.

In the set switch 20 thus constructed when the push button 28 is subjected to a pushing-in operation it is moved in the right direction on FIG. 7 against the spring force of the compression spring 29 to cause the pressing projection 30 to abut to the left side portion 24b so that the movable contact 24 is pressed in the right direction on FIG. 7. At this time the right side portion 24c of the movable contact 24 is caused to abut to the detect projection 26 so that the right side portion 24c of the movable contact 24 is prevented from an additional deformation and, therefore, the curved portion 24a and the left side portion 24b are elastically deformed mainly whereby the contact projection 25 of the left side portion 24 is slidably contacted slightly to the fixed contact 27 so as to make the set switch on. Thus, when the set switch is made on a set circuit is formed in the switch device for vehicle-speed control.

On the other hand, fixed on the switch base 21 is a light-emission diode (LED) 31, arranged above the LED 31 is a lens member 32 and attached on the surface of the lens member 32 is a mark plate 33 on which respective words RESUME, COAST and SET are represented.

In addition, inserted and passed through the operation lever 9 are lead wires 34, 35 and 36, respective one ends of which are connected to terminals 37, 38 and 19b projected through the insulator 6, the other ends thereof being connected respectively to the fixing portion 24d of the movable contact 24, one end of the LED 31 and a common contact connected in common to the other end of the LED 31 and the fixed contact 27.

Projectionally formed on the insulator 6 integrally therewith in such a manner as surrounding the terminals 19a, 19b, 19c, 37 and 38 is a connector receiver 39 to which a connector member 40 is inserted and connected. The connector member 40 is led from the switch device for vehicle-speed control and an earth terminal, not shown. In this case the terminals 19a, 19c and 37 are connected to the switch device for vehicle-speed control and the terminal 19b is connected to the earth terminal, the terminal 38 being connected to a positive terminal of a battery through a light switch of an automobile.

The switch unit 3 constructed as set forth above is integrated to one set in advance and, thereafter, is mounted on the turn-signal base 1.

Description will be given of operation of the present embodiment.

When the push button 28 of the set switch 20 is subjected to a pushing-in operation during the automobile running, the set switch 20 is switched on to form the set circuit of the switch device for vehicle-speed control and a set vehicle-speed, or velocity, in the switch device for vehicle-speed control is increased at a constant rate from the running vehicle-speed of the automobile at that time, the set vehicle-speed being represented on a dashpanel or the like. Furthermore, when the push button 28 is released, the set switch 20 is switched off whereby the set vehicle-speed in the switch device for vehicle-speed control device is stopped to rise and, thereafter, the automobile is kept running at the set vehicle-speed, even if an accelerator pedal is released. Also, when the set switch 20 is instantaneously switched on during the automobile running, the set vehicle-speed in the switch device for vehicle-speed control is set to the running vehicle-speed of the automobile at that time. In this condition when the operation lever 9 is subjected to a rotating operation in the direction of the coast position C the coast circuit is formed in the switch device for vehicle-speed control, and the set vehicle-speed is reduced at a constant rate in the switch device for vehicle-speed control, the vehicle-speed being represented on the dashpanel or the like.

As described above, while a fixed vehicle-speed is set and the switch device for vehicle-speed control is worked, the automobile is kept running at the fixed vehicle-speed, but when the accelerator pedal, a brake pedal or a clutch pedal is operated for necessity of acceleration or deceleration, the switch device for vehicle-speed control is released immediately so that the fixed vehicle-speed is made invalid. After that, however, when the operation lever 9 is rotated to the resume position R, the resume circuit is formed in the switch device for vehicle-speed control and the device is restore so that the fixed vehicle-speed at the time of the release is made valid, again.

In the present embodiment the switch unit 3 where the operation lever 9, the automatic restoring mechanism, the switch mechanism 16, the set switch 20 and the like are integrated is prepared in advance and is mounted on the turn-signal switch base 1. Accordingly, the present embodiment is able to be enhanced in assembly workability as compared with such a case that the operation lever, the automatic restoring mechanism, the switch mechanism and the like are mounted individually on the turn-signal switch base.

In addition, the present embodiment is constructed such that the electrical connection of the switch unit 3 is conducted through the connector receiver 39 formed thereon. Therefore, the present embodiment is made simpler in handling than the case that long lead wires are led from the switch unit 3. From this point of view, it is also recognized that, the present embodiment is able to be improved in assembly workability.

Furthermore, the present invention is constructed such that a selective operation between the resume circuit and the coast circuit is carried out by the rotating operation of the operation lever 9 elongated from the turn-signal switch base 9 so that the selective operation can be easily and securely conducted.

In the above-described embodiment the set switch 20 is constructed so as to be switched on according to the pushing-in operation of the push button 28. However, the present invention is not restricted to the set switch thus constructed. For example, the present invention may be provided with a set switch constructed so as to be switched on by the rotating operation of the operation lever 9 in a direction crossing the rotating direction about the projections 10, 10 at a right angle or a set switch constructed so as to be switched on by the pushing-in operation of the operation lever 9 itself in the axis direction thereof.

Also, in the present embodiment the operation lever 9 is constructed so as to be moved to the resume position R or the coast position C by rotating the operation lever 9 in the upper or lower direction on FIG. 1 but the present invention is not restricted to the operation lever so constructed. That is, in the present invention the operation lever 9 may be constructed so as to be moved to the resume position R or the coast position C by rotating the same in the forward or back direction on FIG. 1 In this case a set switch 20 switched on by rotating the operation lever 9 upwardly or downwardly on FIG. 1 can be provided on the switch unit 3.

As has been described hereinabove, in the switch device for vehicle-speed control according to the present invention the assembly workability is improved and the reliability of operation is enhanced.

What is claimed is:

1. A switch unit for a vehicle-speed control device for automatic running of a vehicle detachably mounted on a base supporting a turn-signal switch lever, which base is fixed to the steering column tube of vehicle, comprising:
   (a) an insulator provided with a connecting portion detachably mounted on the base;
   (b) a switch body for covering the insulator, fixed thereto;
   (c) an operation lever including a lever portion for operation by the occupant and a holder member formed at one end of the lever portion integrally therewith, the operation lever being supported at an axial portion of the holder member by the insulator and the switch body rotatably between a first position and a second position;
   (d) an automatic restoring means disposed between the forward end portion of the holder member and the switch body, for forcing the operation lever in a neutral position between the first position and the second position;
   (e) a set switch mounted on the lever portion of the operation lever, for forming a set circuit of the vehicle-speed control device for setting the vehicle-speed of the automobile at a value selected by the occupant operating the set switch; and
   (f) a switch mechanism including a movable contact supported on a face of the holder portion opposite the insulator and three fixed contacts fixed to the insulator about the rotation axis of the operation lever, the movable contact bridging two of the three fixed contacts to form a coast circuit of the vehicle-speed control device for restoring the set vehicle-speed when the operation lever is rotated to the first position and to form a resume circuit thereof for reducing the set vehicle-speed when the operation lever is rotated to the second position.

2. A switch unit as set forth in claim 1, wherein each of the fixed contacts is formed integrally with a terminal through the insulator to the opposite side thereof.

3. A switch unit as set forth in claim 1, wherein the automatic restoring means comprises a V-shaped guide portion formed on the switch body, a detent ball and an elastic body received in the holder member of the operation lever opposite the V-shaped guide portion of the switch body whereby the detent ball is always forced to the central part of the V-shaped guide portion so that the operation lever is placed in the neutral position.

4. A switch unit as set forth in claim 1, wherein the set switch comprises a push button projecting from the forward end of the forward end of the operation lever, a movable contact moved by the push button and a fixed contact opposite the movable contact.

5. A switch unit as set forth in claim 4, wherein the movable contact of the set switch is formed in a U-shape, one side thereof being fixed to a switch base of the operation lever and the other side being located opposite the push button, whereby the set circuit is formed by pressing the push button in the axial direction of the operation lever.

6. A switch unit as set forth in claim 1, wherein the wherein the insulator is mounted on the base in such a manner that the operation lever is positioned on the side of the steering column opposite from the lever for the turn-signal switch.

7. A switch unit as set forth in claim 1, wherein the operation lever is provided with a light-emission element lighted at the time of the actuation of the speed control device.

* * * * *